Figure 4:
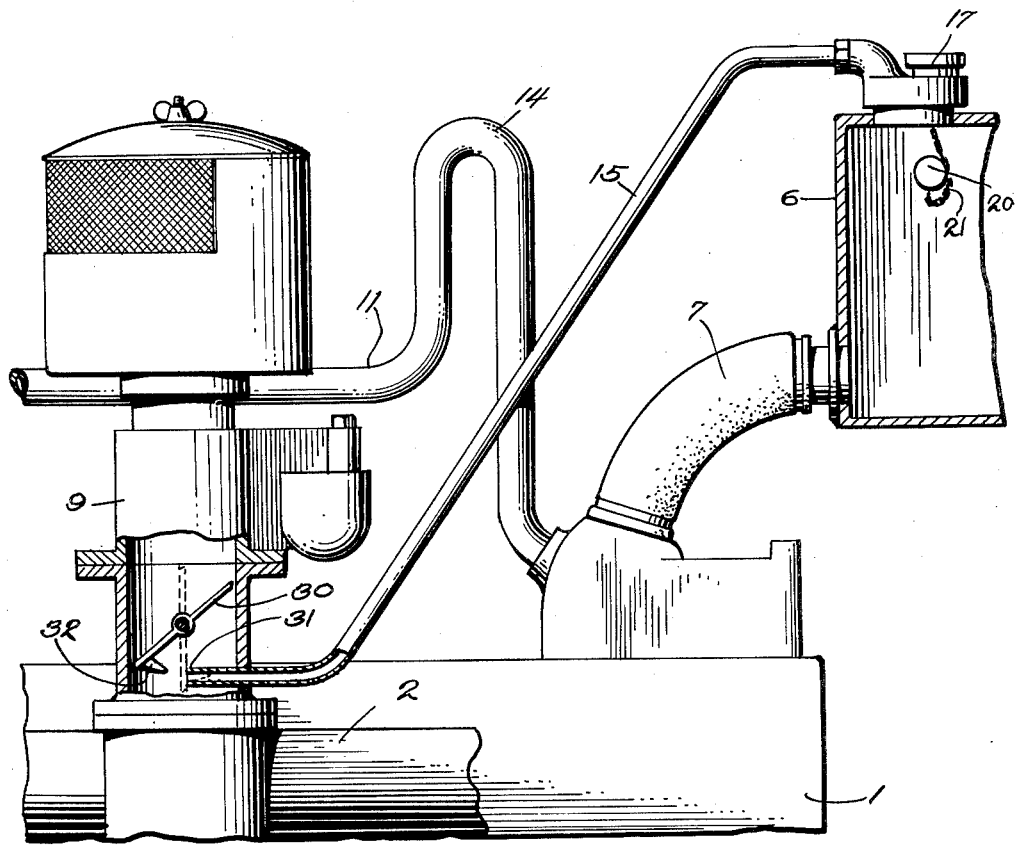

May 5, 1953 W. W. CUSHMAN 2,637,307
INTERNAL-COMBUSTION ENGINE
Filed Aug. 5, 1948 2 SHEETS—SHEET 1
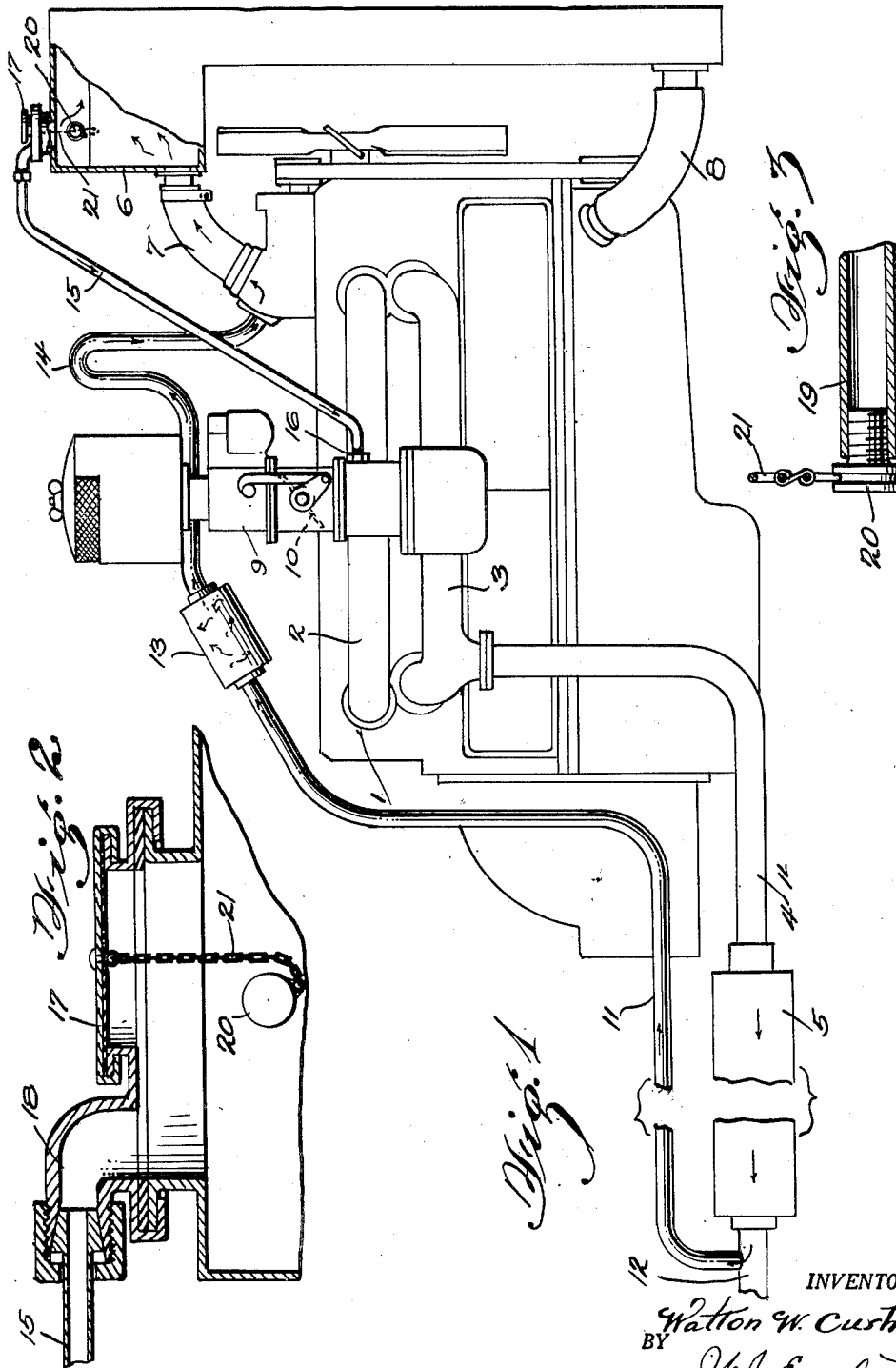
INVENTOR.
Watton W. Cushman
BY
W. J. Eccleston,
ATTORNEY

UNITED STATES PATENT OFFICE 2,637,307

INTERNAL-COMBUSTION ENGINE

Walton W. Cushman, Webb City, Mo.

Application August 5, 1948, Serial No. 42,662

4 Claims. (Cl. 123—25)

(Granted under Title 35, U. S. Code (1952), sec. 266)

The invention described herein, if patented, may be manufactured and used by or for the Government for governmental purposes without the payment to me of any royalty thereon.

This invention relates to internal combustion engines and has for its primary object to increase the economy and efficiency of an engine of this type by so constructing the same as to cause it to operate at a constant compression ratio at all times.

Another object of the invention resides in constructing an internal combustion engine which will operate in a manner to consume practically all of the fuel supplied to the cylinders thereby reducing the formation of poisonous gases such as carbon monoxide, etc.

A further object of the invention consists in the formation of an internal combustion engine such that the tendency to "pump oil" is entirely eliminated.

Another object of the invention resides in the provision of an internal combustion engine in which the specific heat of the intake mixture at part throttle is substantially increased, thereby providing better internal cooling of the engine and reducing the tendency towards detonating the charges in normal running of the engine.

A still further object of the invention consists in the providing of an internal combustion engine which is capable of generating greater power at lower throttle settings than can be generated by conventional engines having the same number and size of cylinders and the same piston stroke.

Other objects and advantages of the invention will be apparent from the following description when taken in connection with the accompanying drawings, in which, Figure 1 is a side elevational view of a conventional internal combustion engine having parts broken away;

Figure 2 is an enlarged sectional detailed view of the upper end of the radiator, Figure 3 is a sectional detailed view of the upper end of the overflow pipe of the radiator, and, Figure 4 is a fragmentary elevational view partly broken away of a slightly modified construction.

In the present illustration of the invention, the conventional internal combustion engine is indicated by the numeral 1 and is provided with the usual intake manifold 2, exhaust manifold 3, exhaust pipe 4 and muffler 5. The numeral 6 designates a conventional radiator provided with inlet and exhaust pipes 7 and 8 respectively, communicating with the cooling system of the engine, the carburetor is indicated by the numeral 9 and the throttle valve by numeral 10.

As already mentioned, a primary object of the invention is to so modify the modern internal combustion engine as to cause it to operate at a constant compression ratio at all times and to this end provision is made for conveying a portion of the exhaust gases from the exhaust pipe or tail to the intake line of the engine between the carburetor and the intake manifold. In other words, the exhaust gases enter the intake line after carburetion. Moreover, the construction is such as to vary the amount of exhaust gases entering a cylinder in inverse proportion to the amount of carbureted fuel and air.

The fluid line for conveying exhaust gases from the tail pipe of the engine includes a pipe 11 connected to the tail pipe adjacent the muffler 5 as indicated by numeral 12 and this pipe may include a filter 13 which serves to eliminate foreign matter and also to aid in cooling the exhaust gases prior to their entrance into the intake manifold. Also, the fact that the pipe 11 is connected to the exhaust pipe at a point adjacent the muffler, provides that the exhaust gases will have lost a considerable portion of their heat before entering the pipe 11 and there will be a substantial additional drop in temperature of the exhaust gases as they are conveyed along the pipe 11 to the interior of the radiator 6. The pipe 11 has at least one portion thereof, for instance, the portion 14 extending to a point above the normal level of water in the radiator so that the water from the radiator will not be permitted to discharge into the pipe 11 as this pipe 11 has its forward end connected with the cooling system of the engine adjacent the pipe 7 which carries the heated water from the system into the radiator and the exhaust gases, as indicated by the arrows, allowing gas to bubble up through the water in the pipe 7 and in the upper portion of the radiator into the space at the top of the radiator.

From the top of the radiator the exhaust gases are drawn through a pipe 15 entering the intake line of the engine between the carburetor and intake manifold as indicated by the numeral 16. The opposite end of the pipe 15 may be connected to the radiator by any preferred means, but in the present disclosure, it is connected to the radiator at a point adjacent the radiator cap 17 as indicated by numeral 18. It is thus apparent that the upper portion of the radiator is open to the negative pressures created in the intake manifold and, therefore, it is necessary that the radiator be completely closed to the atmosphere either by so constructing the radiator originally or by closing the conventional overflow pipe. In the present instance, the overflow pipe is indicated (Fig. 3) by the numeral 19 and may be closed by a screw plug 20 connected to the usual radiator cap 17 by flexible connection 21 to which the plug 20 may be swivelly connected.

It will be apparent from the above description that the fluid line for conveying a portion of the exhaust gases from the exhaust line of the engine to the intake line includes the pipe 11, the pipe 7 of the cooling system of the engine, the upper portion of the radiator and the pipe 15 which provides communication between the radiator and the intake line of the engine. The exhaust gases which enter the intake manifold and the cylinders of the engine are cooled in the various ways indicated above and also as they enter and pass through the water in the cooling system, that is, the pipe 7 and the head of water above the exit opening of the pipe 7 in the radiator 6. These cooled gases enter the intake line of the engine at the point 16 and the proportion of exhaust gases to the carbureted fuel entering the intake manifold, and consequently the cylinders of the engine, is varied in accordance with the position of the throttle valve 10. When the throttle valve 10 is wide open, there will be no suction whatever on the pipe 15 and accordingly no exhaust gases will enter the intake line. However, as the throttle valve is moved away from its fully opened position, the degree of suction on the pipe 15 increases in the amount of exhaust gases entering the intake line and when the throttle valve 10 is completely closed a full charge of exhaust gases will enter the intake line and the cylinders, except, of course, for the small amount of live fuel which is always provided for idling of the engine. With this arrangement, therefore, it will be noted that the engine cylinders are fully charged with gases of one kind or the other throughout the operation of the engine, thus increasing its efficiency of operation by providing the constant compression ratio for which the particular engine is designed. By thus fully charging the cylinders in all operations of the engine at all speeds and under any loads to which it may be subjected, many advantages flow. For instance, no carbon monoxide will be formed since the gasoline vapors will be fully consumed when the cylinders are fully charged and the gases are ignited at the full compression for which the engine is designed. Also, there can be no pumping of lubricating oil past the engine pistons due to the fact that no vacuums or partial vacuums are formed in the cylinders under this manner of operation. Moreover, the specific heat of the intake mixture, at part throttle, is substantially increased due to the picking up of moisture in passing through the water in the radiator, thereby providing better internal cooling of the engine and eliminating the possibility of detonating the charges. And again, the construction described herein is capable of generating greater power than is generated by conventional engines of the same size to the uniformly higher pressures in the cylinders at the time of ignition of the charges through the operation of the engine.

In Figure 4 is shown a construction substantially identical with that heretofore described and shown in Figures 1 to 3 inclusive, except that in this latter form of invention, the throttle valve, which is indicated by the numeral 30, is situated so as to contact the inner end of pipe 15, the latter extending to substantially the center line of the intake line as indicated by the numeral 31. Mounted on the side of the throttle valve adjacent the end 31 of pipe 15 is a substantially cone-shaped or horn-shaped plug 32 which is located as to completely enter and close the end of end 31 of the pipe when the throttle valve itself is in fully open position as indicated in dotted lines in Figure 4. With this shape of the plug 32, it will be apparent that the pipe 31 will be opened gradually as the throttle valve 30 moves toward its closed position, and on the other hand, will be closed gradually as the throttle valve 30 is moved towards its opened position, thereby providing for a gradual increase in the flow of exhaust gases into the intake line and for a gradual shutting off of the flow as the case may be. Otherwise, the construction and operation of this form of the invention is identical with that shown in Figures 1 to 3 inclusive.

In accordance with the patent statutes, I have described the preferred forms of construction and the preferred method of operation of the present internal combustion engine, but it is obvious that the structural details as well as the steps involved in the method of charging the cylinders may be varied without departing from the spirit of the invention and it is intended that all such changes be included within the scope of the appended claims.

I claim:

1. In an otherwise conventional internal combustion engine, an exhaust line, a radiator closed to the atmosphere, a fluid line leading from the exhaust line to the radiator at a point below the normal water level, and a second fluid line leading from the radiator at a point above the water line to the intake line.

2. In an otherwise conventional internal combustion engine, an exhaust line, a radiator closed to the atmosphere, a fluid line leading from the exhaust line at a point adjacent the muffler to the radiator at a point below the normal water level, and a second fluid line leading from the radiator at a point above the water line to the intake line at a point between the carburetor and intake manifold.

3. In an otherwise conventional internal combustion engine, an exhaust line, a radiator, means for closing the overflow pipe of the radiator, means for conveying exhaust gases from the exhaust line to a point below the water level in the radiator, and means for conveying exhaust gases from a point above the water level in the radiator to the intake line.

4. In an otherwise conventional internal combustion engine, an exhaust line, a radiator, means for closing the overflow pipe of the radiator, means for conveying exhaust gases from the exhaust line to a point below the water level in the radiator, a filter in said exhaust conveying means, and means for conveying exhaust gases from a point above the water level in the radiator to the intake line.

WALTON W. CUSHMAN.

References Cited in the file of this patent

UNITED STATES PATENTS

| Number | Name | Date |
|---|---|---|
| 911,345 | Tait et al. | Feb. 2, 1909 |
| 1,440,956 | Ballenger | Jan. 2, 1923 |
| 1,453,560 | Whetstine | May 1, 1923 |
| 1,459,794 | Patty | June 26, 1923 |
| 2,099,802 | Ewing | Nov. 23, 1937 |
| 2,300,774 | Cartmell | Nov. 3, 1942 |
| 2,354,179 | Blanc | July 25, 1944 |